United States Patent [19]
Sweeney

[11] Patent Number: 5,928,490
[45] Date of Patent: Jul. 27, 1999

[54] LAUNDRY WASH PROCESS AND WASTE WATER TREATMENT SYSTEM

[76] Inventor: Charles T. Sweeney, 708 Mockingbird La., Kerrville, Tex. 78028

[21] Appl. No.: 08/966,739

[22] Filed: Nov. 10, 1997

Related U.S. Application Data

[63] Continuation-in-part of application No. 08/688,268, Jul. 29, 1996, Pat. No. 5,795,459.

[51] Int. Cl.$^6$ ...................................................... C02F 1/461
[52] U.S. Cl. .......................... 205/700; 205/701; 205/742; 205/747; 205/751; 205/752; 205/756; 204/242; 204/275
[58] Field of Search ................................... 205/700, 701, 205/742, 747, 751, 752, 756; 204/242, 275

[56] References Cited

U.S. PATENT DOCUMENTS

| | | | |
|---|---|---|---|
| 3,682,190 | 8/1972 | Patil et al. ................ | 204/275 |
| 5,447,630 | 9/1995 | Rummler ..................... | 204/229 X |
| 5,776,351 | 7/1998 | McGinness et al. ......... | 205/688 X |
| 5,795,459 | 8/1998 | Sweeney ..................... | 205/701 |

*Primary Examiner*—Arun S. Phasge
*Attorney, Agent, or Firm*—Neal J. Mosely

[57] ABSTRACT

An improved laundry treatment system comprises a washer which is connected to discharge used water to a tank for filtration and recirculation to the washer, and a tank containing water for making up losses in the wash cycle, and an electrolytic cell therein comprising an enclosed compartment. The electrolytic cell comprises an enclosed compartment containing an anode and a cathode supported on the outside and inside respectively of an opening in the wall of the compartment open to the surrounding liquid when the compartment is immersed in the water in said tank for producing mixed oxidants dissolved in the make up water for oxidizing deleterious components without damaging the fabric being washed.

18 Claims, 3 Drawing Sheets

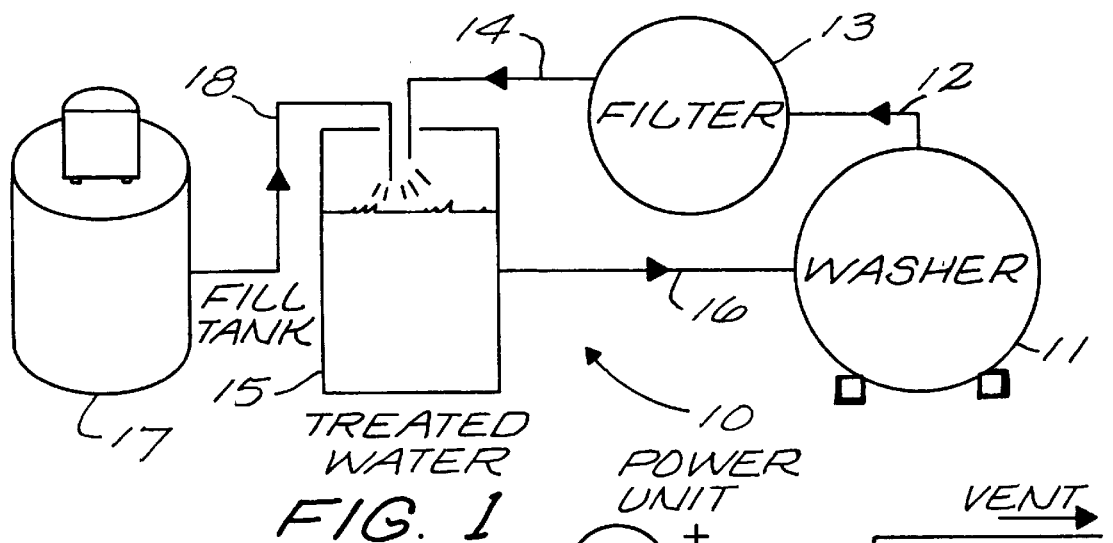
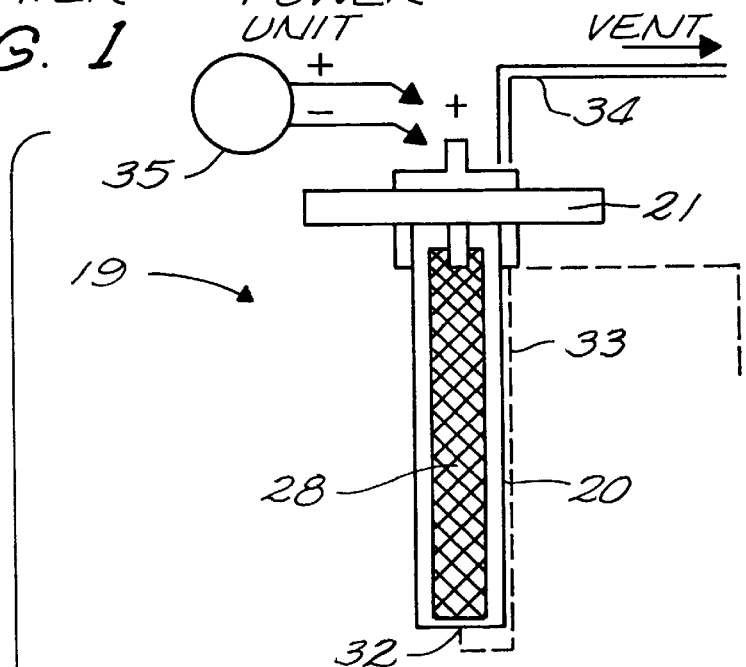
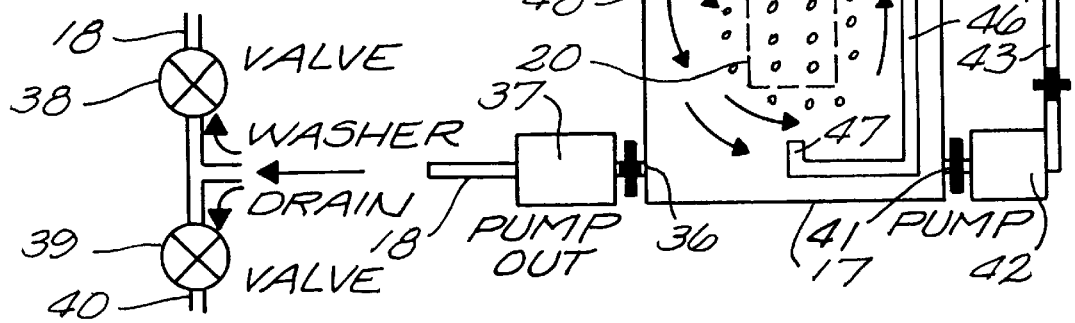

LAUNDRY WASH PROCESS AND WASTE WATER TREATMENT SYSTEM

CROSS REFERENCE TO RELATED U.S. PATENT APPLICATION

This patent application is a continuation-in-part of U.S. patent application Ser. No. 08/688,268, filed Jul. 29, 1996 now U.S. Pat. No. 5,795,459.

BACKGROUND OF THE INVENTION

1. Field of the Invention

This invention relates to new and useful methods and apparatus for commercial laundries using a wash water system wherein wash water maintained in a contact tank is treated with an electrolytically produced mixed-oxidant prior to use in the washing machine.

2. Brief Description of the Prior Art

Arnaud U.S. Pat. No. 5,647,977 discloses a system for removing impurities anticipated to be found in industrial waste water, which system is allegedly suited for waste water systems such as those used for laundry or vehicle washing operations. The system includes aeration, mixing/flocculating, and contact media mechanisms to remove suspended solids, hydrocarbons, and organic materials and undesired dissolved minerals from the treated water.

Arreghini U.S. Pat. No. 5,606,878 discloses a clothes washing machine having a tank for the recovery of liquids and a transfer conduit which, by way of a first pump disposed in the conduit connects the lower portion of the tub to the tank. The lower volume of the tank is connected by way of a suitable conduit and a second pump to a nozzle that discharges into the hydraulic circuit that feeds containers for substances for the washing operation.

Schneider U.S. Pat. No. 5,493,743 discloses a method and apparatus of washing laundry using a reduced amount of, or without the use of, hot water and detergents using a wash water system wherein wash water maintained in a contact tank is ozonated by an ozone generator prior to use in the washing machine. The oxygen and/or dried air is concentrated by an oxygen concentrator before being fed into the generator. The system includes a venturi injector for entraining ozone into the water in the storage and contact tanks. The system also includes contact extenders, static mixers and flow restriction fittings. The spent wash water may be collected, filtered and reused, thereby eliminating waste water disposal problems, resulting in considerable water and energy savings.

Garbutt U.S. Pat. No. 5,409,616 discloses a method and apparatus to restore gray water from a laundry using ozone as a cleaning agent in a closed loop system allegedly for recycling to preserve water, to reduce system size, and to enhance the efficiency of the cleaning system.

Engel U.S. Pat. No. 5,241,720 shows a method and apparatus for washing laundry without hot water and detergent using a closed-loop ozonated wash water system wherein wash water maintained in a storage tank is ozonated by an ozone generator prior to use in the washing machine. The ambient air used in the ozone generator to generate the ozone is undried and temperature controlled. The system includes an injector including a vacuum pump for entraining ozone into the water in the storage tank.

Engel U.S. Pat. No. 5,181,399 and Engel U.S. Pat. No. 5,097,556 disclose a method and apparatus for washing laundry without hot water and detergent using a closed loop ozonated wash water system wherein wash water maintained in a storage tank is ozonated by an ozone generator prior to use in a washing machine. The spent wash water is collected, filtered and reused allegedly eliminating wastewater disposal problems and resulting in considerable water and energy savings. The ozone generator has an air flow configuration to maximize ozone generation.

Durazzani U.S. Pat. No. 4,794,661 discloses a process for treatment of laundry in a basket rotatably mounted in a tub of a washing machine by actuating a valve to introduce water into the tub from a hot water supply until the tub is partially filled to soak the laundry contained in the basket, rotating the basket first at low speed and in alternate directions for a predetermined period of time and then at high speed in a single direction for a predetermined period of time while simultaneously recirculating water from a collector below the basket back into the basket during rotation thereof, and discharging the liquid contained in the basket after rotation of the basket is stopped. This method allegedly preheats the laundry in the basket and the tub making it unnecessary to reheat the washing liquid during a subsequent washing program.

Chelton U.S. Pat. No. 4,104,164 discloses a system for continuously treating waste water from laundries, car washers and like cleaning establishments to recover water soap, detergents, and other chemicals by flowing the untreated water through sand chambers to remove heavy sediment, collecting the water from the sand chambers in a storage compartment, pumping the water through a centrifugal separator for removal of large particulate matter and then through a filter containing media for removal of flocculated soaps, detergents, waxes, and other particulate matter, thence in-to a filtered water storage compartment. The water is pumped from the filtered water storage compartment by a pressure pump. Part of the water containing unused soaps, detergents, conditioning agents, and other chemicals is returned from the filtered water storage compartment for reuse, the other part enters a filter containing absorptive media for removal of the remaining soaps, detergents, conditioning agents, organic compounds and other chemicals. The water is thence returned as pure rinse water to the cleaning establishment. Backwash water from the filters is returned through a separate bag filter recovering the water and leaving behind solids in the bag for removal and easy disposal.

Grantham U.S. Pat. No. 3,961,503 discloses a laundering apparatus for washing, rinsing, etc., in which the water, with the laundry goods, circulates through in a continuous operation. There may be a single unit, or a plurality of units in series. Means is provided for recirculating water from the exit end of a unit to the entrance end or from one unit to another unit in front of it.

SUMMARY OF THE INVENTION

The closest prior art is a method and apparatus of washing laundry using a reduce amount of, or without the use of, hot water and detergents using a closed-loop or open-loop ozonated wash water system wherein wash water maintained in a contact tank is ozonated by an ozone generator prior to use in the washing machine. The oxygen and/or dried air used in the ozone generator to generate the ozone are concentrated by an oxygen concentrator before being fed into the generator in that prior art process. That prior art system includes a venturi injector for entraining ozone into the water in the storage and contact tanks. The prior art system also includes the use of contact extenders, static mixers and flow restriction fittings. The spent wash water may be collected, filtered and reused, thereby eliminating waste water disposal problems, allegedly resulting in considerable water and energy savings.

The present invention relates to a laundry waste water treatment and wash process, and in particular, to such a process using electrolytically produced mixed-oxidants as a cleaning and disinfecting agent. The invention is an improvement over and utilizes an electrolytic cell as shown and claimed in Sweeney U.S. patent application Ser. No. 08/688,268, filed Jul. 29, 1996 now U.S. Pat. No. 5,795,459, which is incorporated herein by reference.

Ozone, used in the prior art process, is a gas at room temperature formed by a combination of free individual oxygen molecules, a powerful oxidizing agent, and as such, has proven effective in the removal of odor, soil and other contamination materials from textiles and has been used in a process for washing laundry using a closed-loop wash water system in which a wash water supply was ozonated and delivered to a series of washing machines for washing laundry. The used wash water collected at the end of the cycle was recirculated back to the storage means for re-use. The waste materials, in the prior art process, such as soil, lint and so forth, were removed from the wash water at the end of the wash cycle prior to it being recycled back to the supply. Filtering, recirculating and replenishing wash water lost during the washing process were also used.

Whereas the prior patented processes using ozone operated with some success, the process was too labor and maintenance intensive for the purpose of washing clothes and has proved too difficult to maintain a sufficient B.O.D for an accurate and controllable purification of a wash water stream.

It is therefore one object of the present invention to provide an improved laundry waste water treatment system using electrolytically produced mixed oxidants for cleaning and decontamination of laundry materials, which is more easily controlled, saves water, and reduces or eliminates the need for hot water, soap and chemicals, thus greatly reducing the cost of operation.

Another object is the provision of an improved laundry treatment system comprising a washer which is connected to discharge used water to a tank for filtration and recirculation to the washer, and a tank containing water for making up losses in the wash cycle, and an electrolytic cell therein for producing mixed oxidants dissolved in the make up water for oxidizing deleterious components without damaging the fabric being washed.

Another object is the provision of an improved laundry treatment system comprising a washer which is connected to discharge used water to a tank for filtration and recirculation to the washer, and a tank containing water for making up losses in the wash cycle, and an electrolytic cell therein comprising an enclosed compartment containing one electrode and another electrode supported on the compartment open to the surrounding liquid when the compartment is immersed in the water in said tank for producing mixed oxidants dissolved in the make up water for oxidizing deleterious components without damaging the fabric being washed.

Another object is the provision of an improved laundry treatment system comprising a washer which is connected to discharge used water to a tank for filtration and recirculation to the washer, and a tank containing water for making up losses in the wash cycle, and an electrolytic cell therein comprising an enclosed compartment containing an anode and a cathode supported on the compartment open to the surrounding liquid when the compartment is immersed in the water in said tank for producing mixed oxidants dissolved in the make up water for oxidizing deleterious components without damaging the fabric being washed.

Another object is the provision of an improved laundry treatment system comprising a washer which is connected to discharge used water to a tank for filtration and recirculation to the washer, and a tank containing water for making up losses in the wash cycle, and an electrolytic cell therein comprising an enclosed compartment containing one electrode, an opening in a wall of the compartment closed by an ion-permeable membrane, and another electrode supported on the compartment, adjacent to the membrane and open to the surrounding liquid when the cell is immersed in the water in said tank for producing mixed oxidants dissolved in the make up water for oxidizing deleterious components without damaging the fabric being washed.

Another object of this invention is to provide an improved method of operating a laundry treatment system comprising providing a washer and connecting it to discharge used water to a tank for filtration and recirculation to the washer, and providing a tank containing water for making up losses in the wash cycle, and providing an electrolytic cell in the make up tank comprising an enclosed compartment containing one electrode and another electrode supported on the compartment open to the surrounding liquid when the cell is immersed in the make up water, inserting the cell into the make up water and energizing the cell for evolution of mixed oxidants to oxidize contaminants for oxidizing deleterious components in the wash water without damaging the fabric being washed.

Another object of this invention is to provide an improved method of operating a laundry treatment system comprising providing a washer and connecting it to discharge used water to a tank for filtration and recirculation to the washer, and providing a tank containing water for making up losses in the wash cycle, and providing an electrolytic cell in the make up tank comprising an enclosed compartment containing one electrode and another electrode supported on the compartment open to the surrounding liquid when the cell is immersed in the make up water, inserting the cell into the make up water and energizing the cell for evolution of mixed oxidants to oxidize contaminants for oxidizing deleterious components in the wash water without damaging the fabric being washed.

Another object of this invention is to provide an improved method of operating a laundry treatment system comprising providing a washer and connecting it to discharge used water to a tank for filtration and recirculation to the washer, and providing a tank containing water for making up losses in the wash cycle, and providing an electrolytic cell in the make up tank comprising an enclosed compartment containing one electrode and another electrode supported on the compartment open to the surrounding liquid when the cell is immersed in the make up water, providing an aqueous solution of sodium chloride or sodium hydroxide in the compartment, inserting the cell into the make up water and energizing the cell for evolution of mixed oxidants to oxidize contaminants for oxidizing deleterious components in the wash water without damaging the fabric being washed.

Another object of this invention is to provide an improved method of operating a laundry treatment system comprising providing a washer and connecting it to discharge used water to a tank for filtration and recirculation to the washer, and providing a tank containing water for making up losses in the wash cycle, and providing an electrolytic cell in the make up tank comprising an enclosed compartment containing an anode, an opening in a wall of the compartment closed by an ion-permeable membrane, and a cathode supported on the compartment adjacent to the membrane open to the surrounding liquid when the cell is immersed in water, inserting the cell into water and energizing the cell for evolution of mixed oxidants to oxidize contaminants for oxidizing deleterious components in the wash water without damaging the fabric being washed.

Other objects will be apparent from time to time throughout the specification and claims as hereinafter related.

BRIEF DESCRIPTION OF THE DRAWINGS

FIG. 1 is a schematic diagram of a closed-loop laundry waste, water treatment and wash system in accordance with the present invention.

FIG. 2 is an exploded schematic view of the oxidant producing cell and connections thereto, in accordance with the present invention.

DESCRIPTION OF THE PREFERRED EMBODIMENTS

Figure 3:
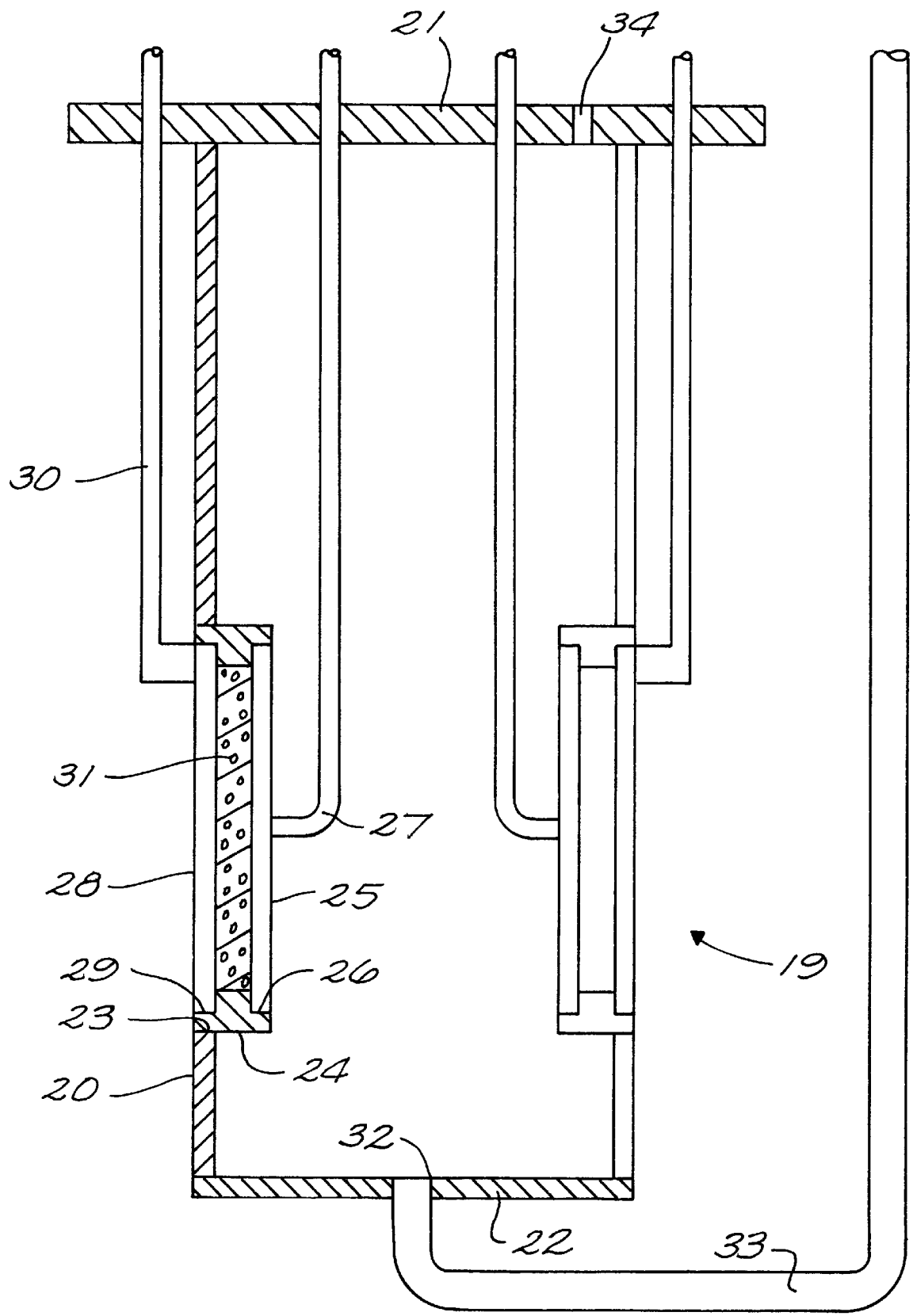
FIG. 3 is a diagrammatic/sectional view of a typical view of the cell used in this invention, as shown in more detail in U.S. patent application Ser. No. 08/688,268 now U.S. Pat. No. 5,795,459.

Referring to FIG. 1, a laundry waste water treatment and wash process and system 10 is illustrated by one or more washing machines 11 of the type used in commercial laundries, including Laundromats, and hotel, school, dormitory, or other similar establishment laundries large quantities of laundry are washed. Each machine 11 is capable of being operated independently of the others. Washing machines 11 are connected by line 12 to filter 13 which is in turn connected by line 14 to a holding tank 15 and by line 16 back to washing machine(s) 11. A make-up water fill tank 17 is connected by line 18 to supply oxidant-containing water to holding tank 15, as further described below. The washing machines may include connections for bubbling air through the wash water during operation.

Fill tank 17 and electrode assembly 19 function in cooperation to produce mixed oxidants which are dissolved in the make-up water. Electrode assembly 19 comprises a tubular PVC (or other plastic) housing 20 closed at the top by plastic plate 21 and at the bottom by plastic plate 22. Housing 20 has a pair of oppositely positioned rectangular openings 23 with plastic molding members 24 constituting a frame for receiving electrode components.

Figure 4:
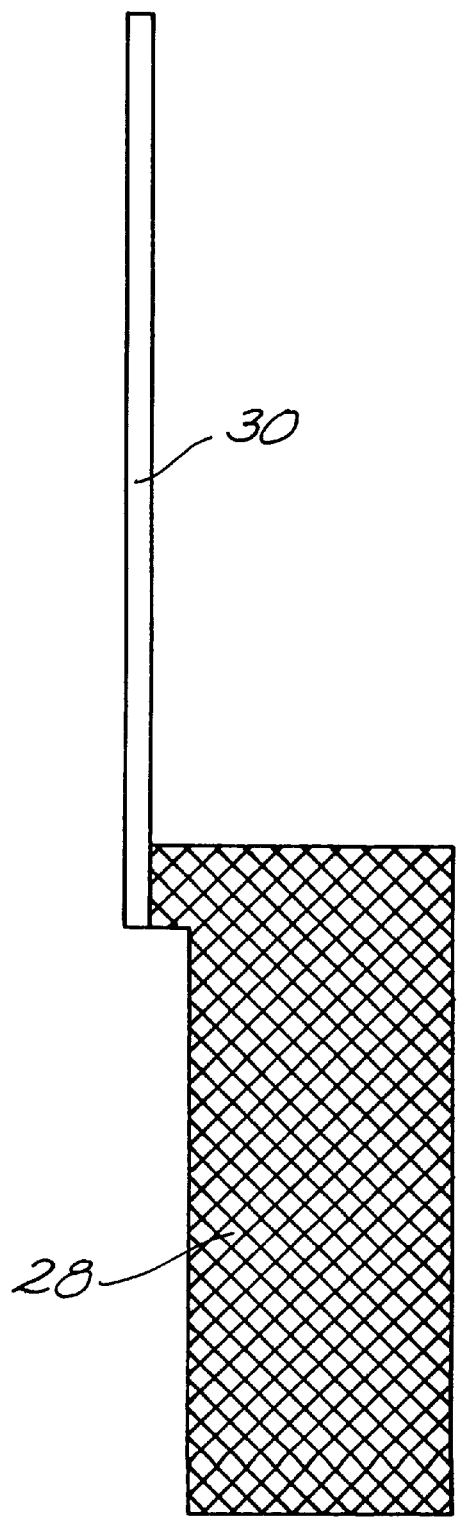
FIG. 4 is a detail plan view of an anode used in the cell shown in FIGS. 2 and 3.
Figure 5:
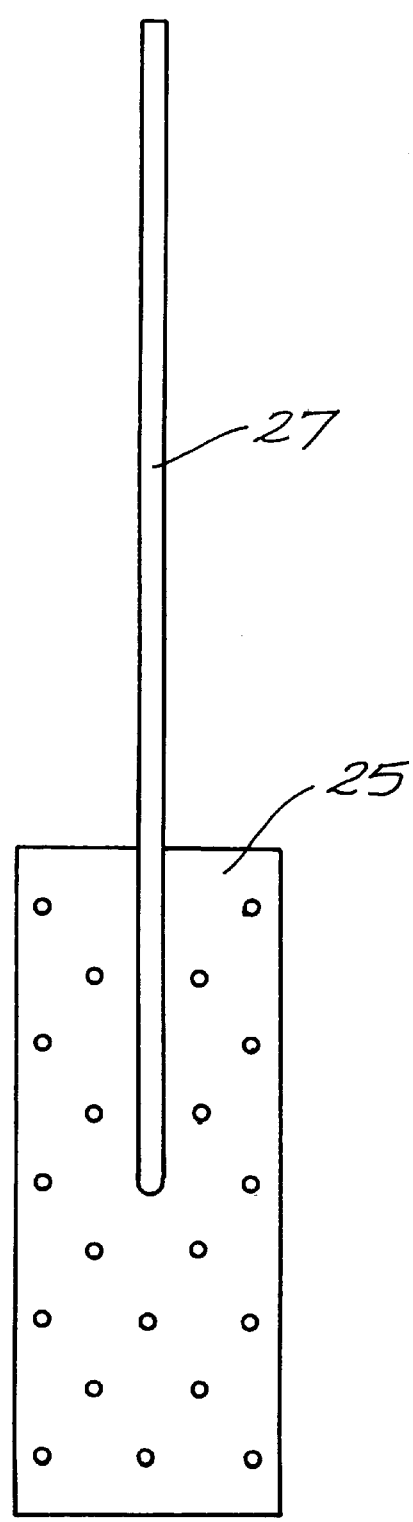
FIG. 5 is a detail plan view of a cathode used in the cell shown in FIGS. 2 and 3.

A metal cathode 25 (FIGS. 3 and 5) is secured in a peripheral groove 26 in frame 24 and has a rod 27 for connection to an external power supply 35 (FIG. 2). A metal anode 28 (FIGS. 3 and 4) is secured in a peripheral groove 29 in frame 24 and has a rod 30 extending through a hole in plate 19 for connection to an external power supply (FIG. 2). The external power supply is preferably positioned on and secured to the upper plate or wall 21 for ease of handling the assembled unit. Anode 28 and cathode 25 are formed of metals suitable for electrolytic cells as recognized by the prior art. A cation-permeable membrane 31 is positioned in frame 24 and secured between anode 28 and cathode 25.

Membrane 31 is an ion-permeable membrane which conducts cations, e.g., $Na^+$. Ion-permeable membrane 17 is preferably a suitable cation exchange, electrically conductive membrane of the type conventionally used in electrolytic cells provided with membrane separation of the anode and the cathode compartments. The preferred membranes are fluorinated polymers and preferably perflurosulfonic acid polymers, preferably NAFION® manufactured by Dupont.

The interior of housing 20 constitutes a cathode compartment for cathodes 25 and the solution contained in the housing. The cathode compartment has a bottom opening 32 which is connected by tube 33 for draining the compartment by siphon action and a top opening 34 for venting hydrogen produced during operation of the cell. When electrode assembly 19 is inserted into tank 17 with wall 21 closing the top of the tank, an electrolytic cell is produced in which the interior of housing 20 forms the cathode chamber and the fill water in tank 17 forms the anode chamber. In this position, housing 20, as shown in dotted lines, extends close to the bottom of the tank.

Tank 17 has a bottom outlet 36 connected to pump 37 in turn connected to line 18 to holding tank 15 and controlled by shut off valve 38. Line 18 is also connected through shut off valve 39 to a drain line 40. Another bottom outlet 41 on the opposite side of tank 17 is connected to pump 42 and line 43 connected into the top of the tank 17 at upper side opening 44. A venturi-mixer 45 is connected between line 43 and line 46 which extends to the bottom of the tank and has an up-turned portion 47 adjacent the bottom end of electrode housing 20. Pumps 37 and 42 are somewhat redundant and can be combined by use of appropriate piping and control valves so that a single pump can recirculate water during operation of the cell and then circulate treated water to the holding tank when a new wash cycle is ready to begin.

The venturi-mixer 45 is positioned above the surface 49 of the water in the fill tank and is effective, by means of the water pumped through the lines 43, 46 to draw in and mix the air and oxidants, produced by the cell, above the water surface 49 into the water in the fill tank and to discharge air bubbles 48 from up-turned pipe portion 47 to flow over the exterior surface of anodes 28. The circulation of air bubbles assists the anodes in producing a higher yield of mixed oxidants, viz., dissolved chlorine, chlorites, hypochlorites, chlorates, peroxides, hydroperoxides, and possible small amounts of ozone and increases the ORP of the solution. The cell is operated to maintain an oxidant level (ORP) of about 800 in the make up water in tank 17. The oxidants are completely in solution and there is no gaseous discharge from the cell, i.e., anode compartment, into the surrounding environment.

Operation and Evaluation of the Process and System

The laundry system shown in FIG. 1 is a commercial laundry apparatus modified to operate in accordance with this invention. The washer 11 is operated through a normal wash cycle and the water from the washer is discharged through a filter to holding tank 15 for recycle to the washer for the next wash cycle. About 80–90% of the water is recycled and make-up water is supplied from fill tank 17 and mixed with the recycle water. The filter is optional. This system allows about 80% water recycle without a filter and up to about 95% recycle with a filter. The use of a filter, however, requires a more expensive control package. The make-up water contains mixed oxidants, entirely in solution, sufficient to maintain an ORP of about 800 to avoid contamination of the wash. The system offers considerable savings in that it utilizes cold water (54° F.) and there is no water loss. There are no detergents or harsh chemicals used and the system is automatic with substantially reduced labor costs. Extensive testing has been conducted on commercial laundry equipment and the lack of deleterious effect on fabric has been established by an independent laboratory.

The oxidant-producing cell is composed of the make-up tank (55 gal) containing 50 gal. water to which salt (about 400–600 ppm) is added for electrical conductance. The cathode compartment of the cell is initially filled with untreated water and keeps filled by water entering through membrane 31. The water in the make-up tank is the anode solution for the cell. An automatic conductivity meter measures the conductance of the solution in make-up tank 17 and controls the addition of measured amounts of salt after each cycle of operation of the cell. The cell is operated on either 115 VAC or 220 VAC according to availability. Pump 42 is a ½–¾ HP pump which recirculates the water in tank 17 about 120 times per hour. After about 10 min. operation the oxidant concentration in the make-up water in tank 17 is about 100 ppm and in 30 min. the water reaches full oxidation strength.

The cell is operated during the time that the washing machine is off and supplies enough oxidant-containing make up water to the water in tank 15 to keep the wash water completely sanitary.

The system of this invention is a closed loop recycled wash water system using a solution of electrolytically produced mixed oxidants to wash clothes with a reduced requirement for or without using hot water or chemicals such as soaps or detergents. The system further includes a venturi-mixer to insure entrainment of the mixed odidants into the make-up water mixed into the recycle water used in the washing machines.

Tests were run on cloth samples for loss in tensile strength after a number of washes. The test was carried out according to the ASTM D 5034 procedure. For washes conducted with untreated recycle water under substantially neutral conditions (pH 7.5) the test sample cloths suffered no loss in tensile strength along the width of the samples after 7 washes. There was some residual chlorine and iron, probably resulting from hard water. The test sample cloths, however, showed about a 15% loss in tensile strength along the length of the samples. Tests of the cloth samples were also carried out on washes conducted in accordance with this invention using oxidant-containing make-up water admixed with the recycle water in tank 15. The oxidant level in the wash water used in these washes was about 100 ppm (ORP 800) and the pH about 6.5. The test samples, after 8 washes, had an increase in tensile strength of 10% in the direction of width and a decrease in tensile strength of 5% in the direction of width of the sample. It is therefore concluded that the process of treatment of this invention does not affect the clothes washed adversely and has the desired results of economy and sanitation.

While this invention has been described fully and completely with emphasis on certain preferred embodiments it should be understood that within the scope of the appended claims the invention may be practiced otherwise than as specifically described.

I claim:

1. A method of washing laundry using a closed-loop wash water system comprising the steps of:

providing washing means, providing a supply of wash water in a recycle holding tank;

providing a supply of water in a make up tank, providing an electrolytic cell positioned in said make up tank or said holding tank operable on energization to provide mixed oxidants in solution therein, said electrolytic cell having an enclosed electrode and an exposed electrode, an electrolyte in contact with said enclosed electrode, and no electrolyte in contact with said exposed electrode until immersion in said make up water or said holding tank water, said electrolytic cell being operable when immersed in said holding tank water or said make up water to generate chlorine or other oxidant, introducing an amount of salt into said water supply in said make up tank to comprise the electrolyte of the anode of the electrolytic cell, introducing a solution of mixed oxidants from said make up tank into said recycle holding tank and mixing the solution into said wash water supply to oxidize deleterious components in the wash water without damaging the fabric being washed;

circulating the oxidant treated wash water supply to said washing means upon commencement of a wash cycle;

washing laundry in said washing means;

collecting said wash water supply at the end of the wash cycle and circulating said wash water supply to said contact tank.

2. A method according to claim 1 including the step of removal of solids from said wash water supply prior to circulation to said holding tank.

3. A method according to claim 1 including the step of operating said cell under conditions of time and current to produce mixed oxidants in an amount retained completely in solution in said make up water and said recycle water when mixed therein.

4. A method according to claim 1 including the step of operating said cell under conditions of time and current to produce mixed oxidants in an amount, in the range from 400 to 600 ppm, retained completely in solution in said make up water and said recycle water when mixed therein, with an ORP of the order of about 800.

5. A method of washing laundry using a closed-loop wash water system comprising the steps of:

providing washing means, providing a supply of wash water in a recycle holding tank;

providing a supply of water in a make up tank, providing an electrolytic cell positioned in said make up tank operable on energization to provide mixed oxidants in solution therein, said cell comprising an electrode assembly having a housing enclosing a compartment containing one electrode and another electrode supported on the exterior of said housing, including the step of immersing said electrode assembly in the make up water in said holding tank as the electrolyte for the anode of the cell and energizing the cell for evolution of mixed oxidants to oxidize contaminants for oxidizing deleterious components in the wash water without damaging the fabric being washed, introducing an amount of salt into said water supply in said make up tank to comprise the electrolyte of the anode of the electrolytic cell, introducing a solution of mixed oxidants from said make up tank into said recycle contact tank and mixing the solution into said wash water supply to oxidize deleterious components in the wash water without damaging the fabric being washed;

circulating the oxidant treated wash water supply to said washing means upon commencement of a wash cycle;

washing laundry in said washing means;

collecting said wash water supply at the end of the wash cycle and circulating said wash water supply to said contact tank.

6. A method according to claim 5 including a pump connected to the bottom and top of said make up tank, a venturi-mixer receiving water circulated from the bottom to the top of said make up tank and positioned above the surface of water in said tank to aspirate air into the stream of water and discharging into the bottom of said make up tank, including the step of operating said pump continuously or intermittently to circulate water from the bottom to the top of said make up tank and to aspirate air from the air space above the surface of the water in said tank into the water stream and into the water at the bottom of said tank.

7. A method according to claim 5 including a pump connected to the bottom and top of said make up tank, a venturi-mixer receiving water circulated from the bottom to the top of said make up tank and positioned above the surface of water in said tank to aspirate air into the stream of water and discharging into the bottom of said make up tank, including the step of operating said pump continuously or intermittently to circulate water from the bottom to the top of said make up tank and to aspirate air from the air space above the surface of the water in said tank into the water stream and into the water at the bottom of said tank.

8. A system of laundry apparatus comprising washing means, recycle holding tank;

a make up tank, pipes interconnecting said washing means and said recycle holding tank in a closed circuit, and connecting said make up tank to said holding tank, an electrolytic cell positioned in said make up or said holding tank operable on energization to provide mixed oxidants in solution therein, said electrolytic cell having an enclosed electrode and an exposed electrode, an electrolyte in contact with said enclosed electrode, and no electrolyte in contact with said exposed electrode until immersion in said make up water or said holding tank water, said electrolytic cell being operable when immersed in said holding tank water or said make up water to generate chlorine or other oxidant, said water supply in said make up tank comprising the electrolyte of the anode of the electrolytic cell, means for introducing a solution of mixed oxidants from said make up tank into said recycle holding tank and mixing the solution into said wash water supply to oxidize deleterious components in the wash water without damaging the fabric being washed; and means for circulating the oxidant treated wash water supply to said washing means upon commencement of a wash cycle.

9. A system of laundry apparatus according to claim 8 including filter means positioned for removal of solids from said wash water prior to circulation to said holding tank.

10. A system of laundry apparatus according to claim 8 including means for operating said cell under conditions of time and current to produce mixed oxidants in an amount retained completely in solution in said make up water and said recycle water when mixed therein.

11. A system of laundry apparatus according to claim 8 including means for operating said cell under conditions of time and current to produce mixed oxidants in an amount, in the range from 400 to 600 ppm, retained completely in solution in said make up water and said recycle water when mixed therein, with an ORP of the order of about 800.

12. A system of laundry apparatus comprising washing means, recycle holding tank;

a make up tank, pipes interconnecting said washing means and said recycle holding tank in a closed circuit, and connecting said make up tank to said holding tank, an electrolytic cell positioned in said make up tank operable on energization to provide mixed oxidants in solution therein, said cell comprises an electrode assembly having a housing enclosing a compartment containing one electrode and another electrode supported on the exterior of said housing, said electrode assembly being immersed in the make up water in said holding tank as the electrolyte for the anode of the cell, and means for energizing the cell for evolution of mixed oxidants to oxidize contaminants for oxidizing deleterious components in the wash water without damaging the fabric being washed, said water supply in said make up tank comprising the electrolyte of the anode of the electrolytic cell, means for introducing a solution of mixed oxidants from said make up tank into said recycle contact tank and mixing the solution into said wash water supply to oxidize deleterious components in the wash water without damaging the fabric being washed; and means for circulating the oxidant treated wash water supply to said washing means upon commencement of a wash cycle.

13. A system of laundry apparatus according to claim 12 wherein said housing comprises a plastic tube having end closure plates, said tube has an opening through a wall thereof, a cathode positioned inside and closing said opening, an anode positioned outside and closing said opening, and a cation-permeable membrane secured in said opening between said anode and said cathode.

14. A system of laundry apparatus according to claim 13 wherein said cell membrane is perflurosulfonic acid polymer.

15. A system of laundry apparatus according to claim 13 wherein said housing includes a bottom opening for draining liquid from the cathode chamber as needed, and a top opening for discharge of hydrogen produced during operation of said cell.

16. A system of laundry apparatus according to claim 12 including
- a pump connected to the bottom and top of said make up tank,
- a venturi-mixer receiving water circulated from the bottom to the top of said make up tank and positioned above the surface of water in said tank to aspirate mixed oxidants produced by the cell into the stream of water and discharging into the bottom of said make up tank to insure complete solution of the mixed oxidants in the make up water, and
- means for operating said pump continuously or intermittently to circulate water from the bottom to the top of said make up tank and to aspirate mixed oxidants in the air space above the surface of the water in said tank into the water stream and mix the mixed oxidants into the water at the bottom of said tank.

17. A system of laundry apparatus according to claim 16 including
- a pipe from said venturi-mixer to the bottom of said tank to circulate water from the bottom to the top of said make up tank and to aspirate mixed oxidants in the air space above the surface of the water in said tank into the water stream and mix the mixed oxidants into the water at the bottom of said tank,
- said last named pipe having an end portion constructed and positioned to discharge air bubbles over the surface of said anodes on said cell housing.

18. A system of laundry apparatus according to claim 12 including
- a second pump on said make up water tank and valves connected thereto for directing water flow to said washing means or to drain.

* * * * *